A. SOWDEN.
Saw Toothing Machine.
No. 57,205.  Patented Aug. 14, 1866.
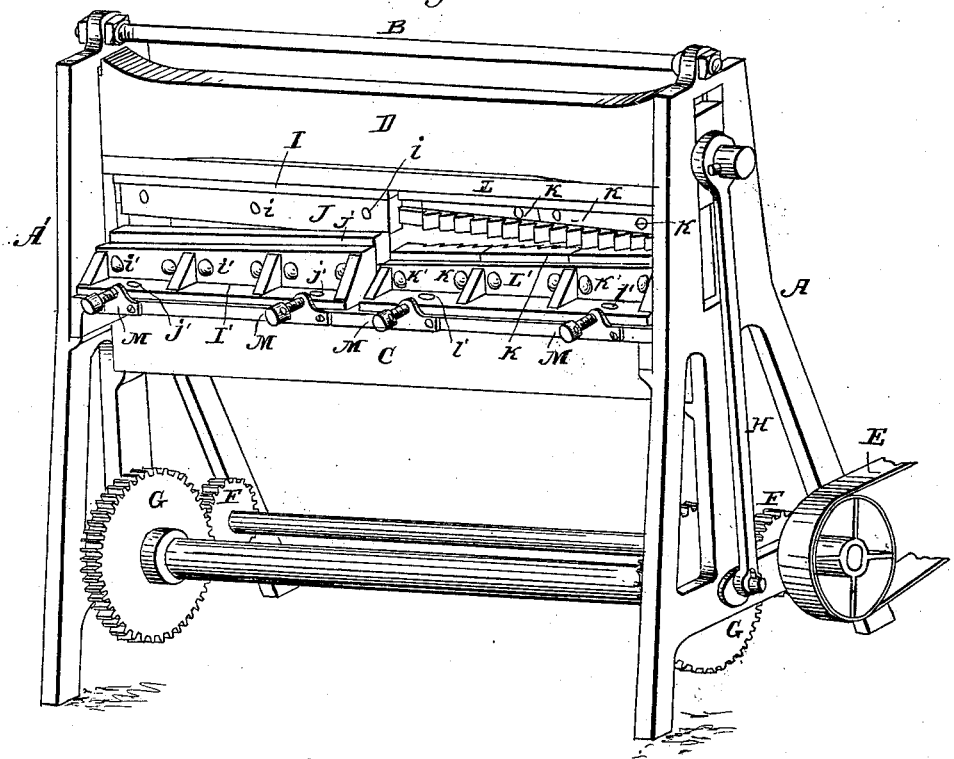
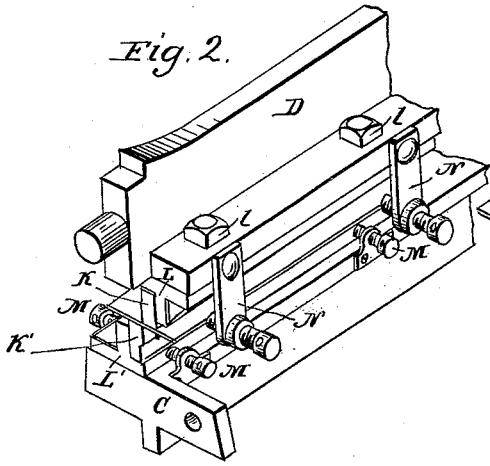
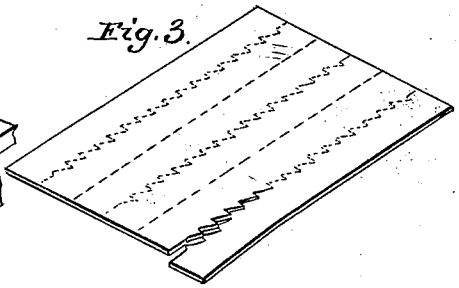

UNITED STATES PATENT OFFICE.

ADAM SOWDEN, OF CINCINNATI, OHIO.

IMPROVED SAW-TOOTHING MACHINE.

Specification forming part of Letters Patent No. 57,205, dated August 14, 1866.

*To all whom it may concern:*

Be it known that I, ADAM SOWDEN, of Cincinnati, Hamilton county, Ohio, have invented a new and useful Machine for Manufacturing Saws; and I hereby declare the following to be a full, clear, and exact description thereof, reference being had to the accompanying drawings, making part of this specification.

My invention is designed to enable the entire teeth of two saws to be formed at one stroke or cutting, without the slightest waste of material, the said invention, in its most complete form, enabling a sheet or plate of steel to be manufactured wholly into saws at a single handling, with a great saving of steel, labor, and time, and of one-half of the wear to which the dies or cutters of saw-toothing machines are commonly subject, where the metal removed in forming the teeth of the saw is wasted, instead of being made to constitute the teeth of another saw, as in my system of operation.

Figure 1 is a perspective view of the front and one end of a machine embodying my invention. Fig. 2 represents a portion of the rear side of the machine. Fig. 3 is a plate of steel, exhibiting my process of toothing and shearing.

A A' is the frame of the machine, provided with a tie-rod, B, and bed-plate C, and slotted at $a\ a'$ to receive the reciprocating gate D. The gate D may be operated by a belt-pulley, E, through gearing F G and pitman H, or other mechanical devices.

A pair of steelings or cutters, J J', for straight shearing, are secured to the shear-blocks I I' by bolts $i\ i'$, the blocks I and I' being, by means of bolts $j\ j'$, secured to the gate D and bed-plate C, respectively.

At the opposite end of the machine a pair of serrated jaws, steelings, or cutters, K K', for saw-toothing, are secured to the gate and bed, respectively, by means of blocks L L' and bolts $k\ k'$ and $l\ l'$.

The cutting-edges of both the upper jaws, I and K, are acclined in the manner shown, so as to shear gradually from right to left, the two indented jaws K K' cutting the successive teeth consecutively one after another, yet by a single stroke of the gate, so as to form the salients of one saw out of the re-entrants of the other, and vice versa.

The lower shear-blocks, I' and L', are capable of adjustment by means of bolts M.

Adjustable gages N are secured to both the shearing and toothing ends of the gate D. Being secured to the gate, the said gages N travel down along with the cut plate or saw, and on the return-stroke the work is freely released, so that sticking is impossible.

Operation: When the gate is at the upper extremity of its stroke the plate or blank to be cut is placed against the gages N at the toothing end of the machine. In the act of depressing the gate successive teeth are formed along the plate, tooth out of tooth, throughout the entire length. An entire saw is thus cut and the plate completely toothed for another one at a single stroke. At the next stroke of the gate the plate is shifted to the shearing end, and another complete saw is sheared off. Thus a perfect saw is completed at the alternate ends at each revolution of the machine.

In the ordinary method of making saws the plate is first reduced to strips of the required width, inclusive of the teeth, which latter are cut one by one at a stroke, all the clippings being wasted, and the dies or cutters being subjected to double the wear of mine, in which the act of cutting a tooth is necessarily accompanied by the formation of a corresponding re-entrant upon the blank.

I am aware that the toothing-jaws K K' and the shearing-jaws J J' combined and arranged as described by me is not new, the same being described in the patent to Ward Eaton, May 16, 1854, and I do not claim said combination; but What I do claim is—

The arrangement of shearing-jaws J J' and toothing-jaws K K' in the described combination with the adjustable traveling gages N, as and for the purposes set forth.

In testimony of which invention I hereunto set my hand.

ADAM SOWDEN.

Witnesses:
GEO. H. KNIGHT,
JAMES H. LAYMAN.